US011321946B2

(12) United States Patent
Grady et al.

(10) Patent No.: US 11,321,946 B2
(45) Date of Patent: *May 3, 2022

(54) CONTENT ENTITY RECOGNITION WITHIN DIGITAL VIDEO DATA FOR DYNAMIC CONTENT GENERATION

(71) Applicant: IMDb.com, Inc., Seattle, WA (US)

(72) Inventors: Rob Grady, Shoreline, WA (US); Adam Ford Redd, Shoreline, WA (US); John Lehmann, Seattle, WA (US); Scott Stephenson, Seattle, WA (US); Aaron Wooster, Shoreline, WA (US)

(73) Assignee: IMDb.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,996

(22) Filed: Feb. 25, 2020

(65) Prior Publication Data

US 2020/0193165 A1    Jun. 18, 2020

Related U.S. Application Data

(62) Division of application No. 15/995,986, filed on Jun. 1, 2018, now Pat. No. 10,607,086.

(51) Int. Cl.
*G06K 9/00* (2006.01)
*G06V 20/40* (2022.01)
*G06F 16/958* (2019.01)
*G06V 40/16* (2022.01)

(52) U.S. Cl.
CPC ............ *G06V 20/46* (2022.01); *G06F 16/958* (2019.01); *G06V 40/161* (2022.01); *G06T 2207/30168* (2013.01)

(58) Field of Classification Search
CPC .......... G06K 9/00228; G06K 9/00744; G06K 9/00758; G06T 2207/30168
See application file for complete search history.

(56) References Cited

U.S. PATENT DOCUMENTS

| 2011/0135283 | A1* | 6/2011 | Poniatowki | ...... | H04N 21/47217 386/297 |
| 2015/0020106 | A1* | 1/2015 | Belyaev | ............... | H04N 21/458 725/45 |

* cited by examiner

*Primary Examiner* — Manuchehr Rahmjoo
(74) *Attorney, Agent, or Firm* — Patterson + Sheridan, LLP

(57) ABSTRACT

Techniques for selectively associating frames with content entities and using such associations to dynamically generate web content related to the content entities. One embodiment performs a facial recognition analysis on frames of one or more instances of video content to identify a plurality of frames that each depict a first content entity. A measure of quality and a measure of confidence that the frame contains the depiction of the first content entity are determined for each of the identified plurality of frames. Embodiments select one or more frames from the identified plurality of frames, based on the measures of quality and the measures of confidence. The selected one or more frames are associated with the first content entity and web content associated with the first content entity is generated that includes a depiction of the selected one or more frames in association with an instance of video content.

20 Claims, 9 Drawing Sheets

CONTENT ENTITY RECOGNITION WITHIN DIGITAL VIDEO DATA FOR DYNAMIC CONTENT GENERATION

CROSS-REFERENCE TO RELATED APPLICATIONS

This application is a divisional of co-pending U.S. patent application Ser. No. 15/995,986, filed Jun. 1, 2018. The aforementioned related patent application is herein incorporated by reference in its entirety.

BACKGROUND

The present disclosure relates digital video processing, and more specifically, to techniques for identifying frames within instances of video content that contain depictions of a content entity and dynamically generating digital content using the identified frames.

With the evolution of standard languages and protocols for implementing web services and related technologies, many web site operators incorporate dynamic content into their web pages. In many cases, such dynamic content is retrieved from external web services or applications. In some instances, such external web services or applications may be freely accessible via the Internet. Examples of conventional types of dynamic content that are available via existing web services include driving directions, weather information, and product descriptions and reviews.

Many forms of digital content, however, are still generated manually by users. For example, many digital videos are still filmed and edited manually by one or more users, and the thumbnails for such digital videos are typically selected manually as well. Such manual content generation generally increases the cost and decreases the scalability of such web sites, as the web sites may need to hire a number of additional employees to produce additional content for the web sites, and generally the amount of content produced will roughly scale linearly with the number of content-producing employees. Moreover, the quality of the digital content being produced can also scale with the cost of producing the digital content, as more expensive equipment, software, and content producers, as well as more time spent producing the content, may be needed to produce the highest quality digital content.

DETAILED DESCRIPTION

Figure 1:
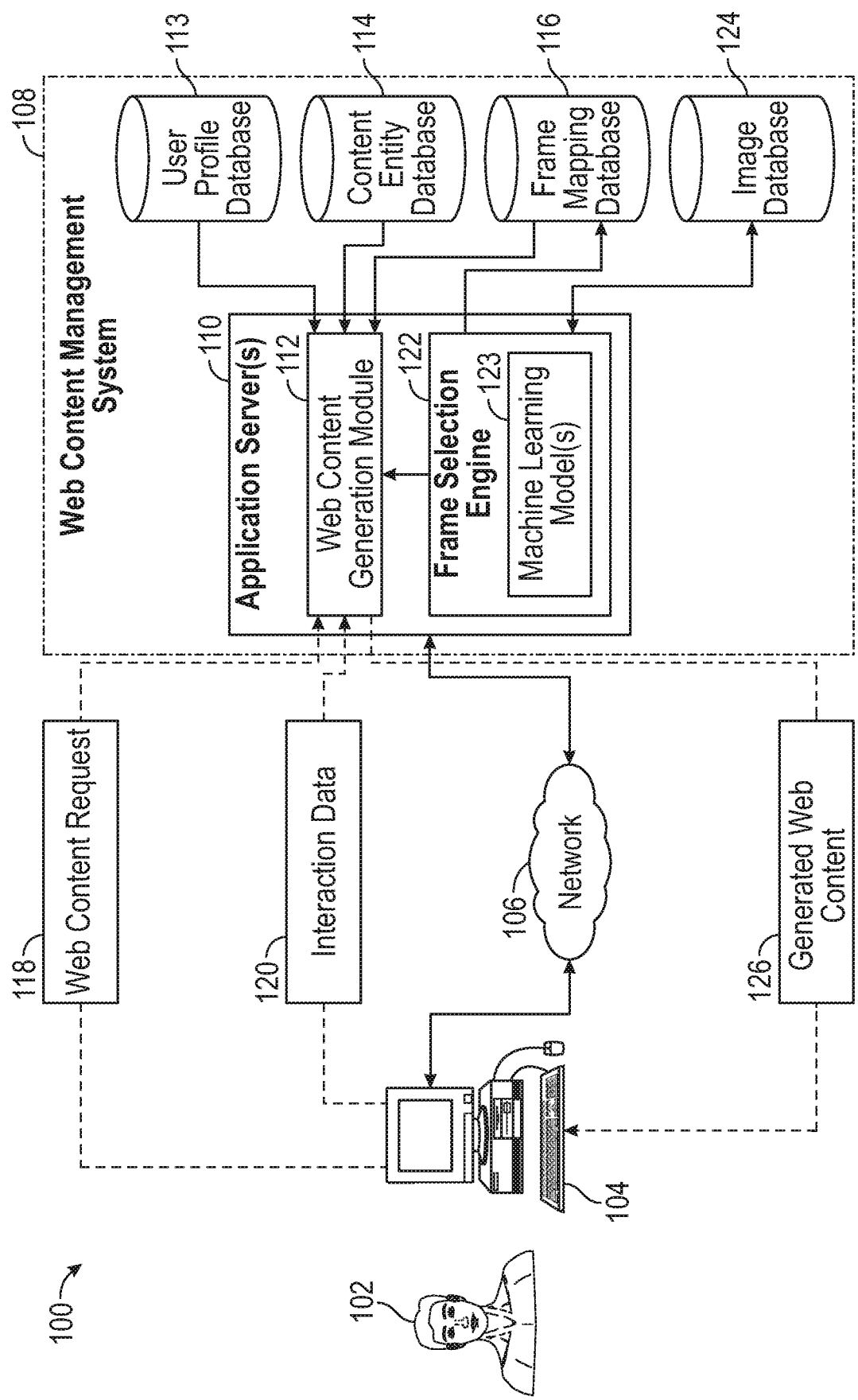
FIG. 1 is a block diagram illustrating a system and workflow for determining recommended goods and services, according to one embodiment described herein.

Some popular sites today serve as entertainment references for millions of creative entities. Such creative entities can include, for example, actors, directors, screenwriters, portrayed characters (e.g., a fictional character portrayed by an actor within a film), an animated character, etc. Each creative entity could be identified within the context of a given site using a distinct identifier (e.g., within a database). Such identifiers could be used by, for example, staff and other users to effectively organize and tag relevant information relating to each creative entity. While certain data may be relevant only to a specific creative entity (e.g., a particular actor's birthday), other data can be associated with multiple creative entities at once (e.g., a trailer for a particular movie containing multiple different actors). While content that is unique to a single content entity can be associated with images that are unique to that same content entity (e.g., pictures of a given actor can be tagged with the unique identifier of the actor within the database), conventional solutions do not provide adequate ways to map content associated with multiple creative entities with individual images of the multiple creative entities on a page by page basis. For example, a movie trailer that features a number of different co-starring actors may be associated with all of the co-starring actors. However, frequently when a thumbnail image is chosen for the movie trailer, the thumbnail image will only depict a sub-set of the actors. This can create confusion in users of the site, as a thumbnail image for the movie trailer depicted on a particular actor's dedicated page of the site may not depict the particular actor at all.

In one embodiment, videos uploaded to a particular site first goes into a cloud computing environment, where the videos are ingested and transcoded through an Elastic Transcode service. The transcoded videos are subsequently published to multiple cloud locations accessible via the site's website and other applications (e.g., mobile applications). In addition to transcoding the videos, the videos can undergo a process where image thumbnails (i.e., screengrabs from the playback of the video) are generated at fixed intervals (e.g., 10 second intervals). Such thumbnails can then be stored for further processing (e.g., within a database).

A thumbnail can then be selected (e.g., randomly from the available thumbnails that don't contain a black screen) and the selected thumbnail can be used for display across the site. For example, the thumbnail can then be leveraged as a preview of the content of the video for users of the site, with the goal being inducing the user to click and watch the video. In some sites, only one thumbnail may be selected for a given video object, regardless of the context of where that video is displayed. In the example, a video (e.g., a trailer) for a movie featuring multiple content entities (e.g., multiple different actors) could be featured on a web page for the movie, as well as various web pages for all the related actors. In such an example, each page featuring the video would display the same primary thumbnail image. However, this often leads to contextually confusing or irrelevant images across the site, e.g., as a picture of a first actor, if selected as part of primary thumbnail, would be displayed on the pages of various other actors within the film. Moreover, when the thumbnail for the video does not depict one of the various other actors but is shown on the page dedicated to the other actor, users of the site may incorrectly not associate the other actor with the video, even though the other actor appears within the video itself.

As such, embodiments described herein provide techniques that leverage computer vision software to proactively identify high quality and contextually-relevant thumbnail images. In one embodiment, after a video is uploaded, a computer vision service can be called to scan the video from its cloud container and analyze each frame for faces and image quality (e.g., based on color saturation, stillness, brightness/contrast). Further, facial images can be mapped against a database of known faces (e.g., content entities from the site's database) and a confidence score of a match can be calculated. The service can return a number of thumbnails, e.g., based on previously defined criteria for quality, faces and facial confidence scores. The thumbnails, alongside their discovered content entity mapping, could be provided to a video publisher component for the site, which can generate the mappings in the site's database. Subsequently, for pages across the site that feature the related video, the thumbnail corresponding to the specific page can be displayed. Doing so enables thumbnails to be dynamically generated and selected specifically for individual pages, thereby improving the performance of the site through the use of computer vision software and the automatic display of a single object made contextually relevant in multiple locations through the use of dynamically generated thumbnails.

FIG. 1 is a block diagram illustrating a system and workflow for determining recommended goods and services, according to one embodiment described herein. Generally, FIG. 1 and the following description are intended to provide a brief, general description of a suitable computing environment in which the embodiments described herein may be implemented. In particular, FIG. 1 is a system and network diagram that shows an illustrative operating environment 100 including several software components for managing relationships and transactions between creative entities and venues.

The environment 100 includes a user 102 that uses a client device 104 to access a web content management system 108 across a network 106. The user 102 may be an individual or entity that desires to create, using the web content management system 108, an itinerary for a creative entity for performing at one or more venues. The client device 104 may be a personal computer ("PC"), a desktop workstation, a laptop, a tablet computer, a notebook, a personal digital assistant ("PDA"), an electronic-book reader, a game console, a set-top box, a consumer electronics device, a server computer, or any other computing device capable of connecting to the network 106 and communicating with the web content management system 108.

The network 106 may be a local-area network ("LAN"), a wide-area network ("WAN"), the Internet, or any other networking topology known in the art that connects the client device 104 to the web content management system 108. The web content management system 108 may include a number of application servers 110 that provide various online web and application services to the client device 104 over the network 106. The user 102 may use a client application executing on the client device 104 to access and utilize the online web and application services provided by the application servers 110.

In one embodiment the client application is a web browser application. Generally, such a web browser application can exchange data with the application servers 110 in the web content management system 108 using the hypertext transfer protocol ("HTTP") over the network 106. The client application could also be a stand-alone client application (e.g., a mobile application) configured for communicating with the application servers 110. The client application might also utilize any number of communication methods known in the art to communicate with the web content management system 108 and/or the application servers 110 across the network 106, including remote procedure calls, SOAP-based web services, remote file access, proprietary client-server architectures, and the like.

The application servers 110 may execute a number of modules to provide web-based and other content to the client device 104. The modules may execute on a single application server 110 or in parallel across multiple application servers in the web content management system 108. In addition, each module may consist of a number of subcomponents executing on different application servers 110 or other computing devices in the web content management system 108. The modules may be implemented as software, hardware, or any combination of the two.

As shown, the application servers 110 include a web content generation module 112 and a frame selection engine 122. Additionally, the web content management system 108 includes a user profile database 113, a content entity database 114, a frame mapping database 116 and an image database 124. Generally, the user profile database 113 contains data relating to various users of the web content management system 108. For example, the user profile database 113 could contain metadata describing each user (e.g., the user's name, saved physical addresses, default physical address, etc.), as well as preconfigured payment information for the user. As an example, credit card information for a particular user could be encrypted and securely stored within the user profile database 113, for use in processing transactions for the particular user.

In one embodiment, the user profile database 113 includes user interaction data for users of a site. Such user interaction data could generally contain a set of personalization signals that have been collected from the user's interactions on the site. For instance, during a session when the user is browsing the site, interaction data could be collected that describes the user's behavior on the site during the session. As an example, the site could collect information on the path's through the site (e.g., the links the user selected when navigating the site), how long the user viewed each page, the user's behavior (e.g., scrolling) on each page, and so on. The frame selection engine 122 could then tailor the selection of images to the user, based on the collected user interaction data. For example, the frame selection engine 122 (or other logic for the site) could classify the user's behavior into a particular cluster of a plurality of clusters a user behavior, and the frame selection engine 122 could then select a frame for a given content entity that best suits the particular cluster.

Of note, while examples are provided herein with respect to selecting images to use as thumbnails for links to video content on a site, more generally the frame selection engine 122 can select images for use in a variety of different contexts. For instance, when viewing a playlist of videos on the site, a slate can be provided that includes thumbnails for upcoming videos in the playlist. The frame selection engine 122 could dynamically select images to use for each of the upcoming videos, based on the user profile database 113. For example, if the frame selection engine 122 determines that the user is following or otherwise subscribed to information about a particular content entity and the frame selection engine 122 determines that the particular content entity is depicted within an upcoming video within the playlist, the frame selection engine 122 could select a frame that depicts the particular content entity to display as a thumbnail for the video.

The content entity database 114 generally stores data relating to various content entities recognized by the web content management system 108. For example, for a given content entity (e.g., an actor), the content entity database 114 could store metadata describing the content entity (e.g., a biography, a birth date, etc.), a listing of other content associated with the content entity (e.g., a listing of movies, shows and other content the actor has appeared in), and so on. The frame mapping database 116 generally stores information mapping frames of video content with content entities depicted within the frames. The image database 124 generally contains an assortment of images used on the site provided by the web content management system 108. For example, images from the image database 124 could be provided as part of an image gallery on one or more web pages of the site.

Generally, the frame selection engine 122 is configured to select particular frames depicting a given content entity for use on the site. In doing so, the frame selection engine 122 can consider a measure of quality of the frames (e.g., based on a measure of blur within the frame, a measure of stillness for the frame, a contrast value for the frame, a brightness value for the frame, a bit depth corresponding to the frame, etc.). More generally, the frame selection engine 122 can consider any parameter associated with image quality in selecting frames.

In the depicted embodiment, the frame selection engine 122 contains a machine learning model 123. For example, the machine learning model 123 could be configured to accept a given image (e.g., taken from playback of a frame of video data) as input and the machine learning model is configured to output a corresponding measure of quality for the input image. In such an example, the machine learning model 123 could be trained using a supervised learning technique, which uses a training set of images and a corresponding measure of quality associated with each training image.

In a particular embodiment, the frame selection engine 122 is configured with a machine learning model 123 configured to accept an image (e.g., taken from playback of a frame of video data) as input and to output a confidence value indicating a likelihood that the input image corresponds to a particular content entity. For example, such a machine learning model could be trained using a supervised learning approach, where a number of images of the content entity are provided as training samples for the model. In doing so, multiple distinct images of the content entity can be provided, including images of the content entity outside of films, images of the content entity wearing a costume for a particular film, images of the content entity enhanced using computer-generated imagery (CGI) as part of a film, and so on.

In one embodiment, the frame selection engine 122 can identify a plurality of frames from a first one or more instances of video content, where each of the plurality of frames contains a respective depiction of a first content entity. In one embodiment, the frame selection engine 122 is configured to use facial recognition techniques to determine a region of pixels within a frame that correspond to a human face, and the frame selection engine 122 can then compare the region of pixels with images known to be associated with the first content entity within the image database 124 to determine that the frame in question contains a depiction of the first content entity (e.g., when the region of pixels is substantially similar to one of the images within the image database 124 that is known to correspond to the first content entity).

The frame selection engine 122 can then select one or more frames from the identified plurality of frames, based at least in part on attributes of the one or more frames. For example, in doing so, the frame selection engine 122 can determine a measure of quality of each of the frames, along with a confidence value for each frame (e.g., indicating a likelihood the particular frame includes a depiction of the first content entity). The frame selection engine 122 can then select the one or more frames as the frames having the greatest measures of quality and the greatest confidence values. The web content generation module 112 can then generate an object for inclusion in web content associated with the first content entity, wherein the object includes a depiction of the selected one or more frames. For example, the web content generation module 112 could generate a link to video content for inclusion on a page of the site and could use one of the selected frames as a thumbnail for the video content.

In one embodiment, the frame selection engine 122 is configured to filter the frames depicting the first content entity using one or more predefined criteria. For instance, the frame selection engine 122 could select only the frames that are determined to depict the first content entity having one or more defined expressions. As an example, it may be undesirable to select a frame that depicts the content entity playing the protagonist of a movie as upset or losing a particular conflict within the movie. As such, the frame selection engine 122 could filter the frames depicting the first content entity to only include those frames where the depiction has a happy or confident expression.

In one embodiment, the web content generation module 112 can receive interaction data 120 describing how the users 102 interact with the generated web content 126 on the client devices 104. The web content generation module 112 could use such interaction data 120 for refining the selection and use of images generated from the selected frames of the instance of video content. For example, the web content generation module 112 could generate a plurality of instances of web content associated with the first content entity and containing generated web objects that each include a depiction of one of the selected two or more frames and could provide the generated plurality of instances of web content to a plurality of client devices 102. The web content generation module 112 could then monitor interactions with the generated plurality of instances of web content on the plurality of client devices 102, by analyzing the interaction data 120 received from the client devices 102.

The web content generation module 112 could update a strength of the association between the selected one or more frames and the first content entity, based on the monitored interactions, and could select at least one of the two or more frames, based on the updated strength of the association. The web content generation module 112 could dynamically scale a frequency of use of the selected at least one frame, in generating web objects for inclusion in instances of web content associated with the first content entity, based on the monitored interactions with the first frame on at least one of the plurality of client devices. For example, if the web content generation module 112 initially receives two frames depicting a particular content entity from the frame selection engine 122, and the web content generation module 112 could generally use these two frames equally in producing the generated web content 126 sent to the client devices 104.

However, if the web content generation module 112 determines that generated web content 126 for a particular one of the two frames produces a significantly higher level of interaction from the users 102 of the client devices 104, the web content generation module 112 could dynamically scale the usage of the particular frame, such that the particular frame is used more frequently in generating content for the client devices 104. In some instances, where a particular frame has a sufficiently low level of interaction, the web content generation module 112 could remove that frame from use altogether. Doing so enables the web content generation module 112 to refine its usage of selected frames over time in an automated fashion and without requiring user intervention, and does so in a way that maximizes interactions on the client devices 104 and thereby improves the overall site provided by the web content management system 108.

In one embodiment, the web content generation module 112 is configured to tailor the generated web content 126 to the preferences of the user 102, using data describing the user's preferences and other attributes of the user within the user profile database 113. For example, the web content generation module 112 could receive the web content request 118 from the client device 104 specifying a first content entity, and the web content generation module 112 could retrieve a user profile from the user profile database 113 associated with a current session on the client device (e.g., based on which user is currently logged in to the site provided by the web content management system 108 on the client device 104). The web content generation module 112 could then select one of the frames provided by the frame selection engine 122 for use in generating the web content 126, based at least in part on data within the retrieved user profile. For example, where the retrieved user profile indicates that a particular user 102 has a strong preference for action movies, the web content generation module 112 could select a frame provided by the frame selection engine 122 that is determined to depict a high level of action within the video.

Figure 2:
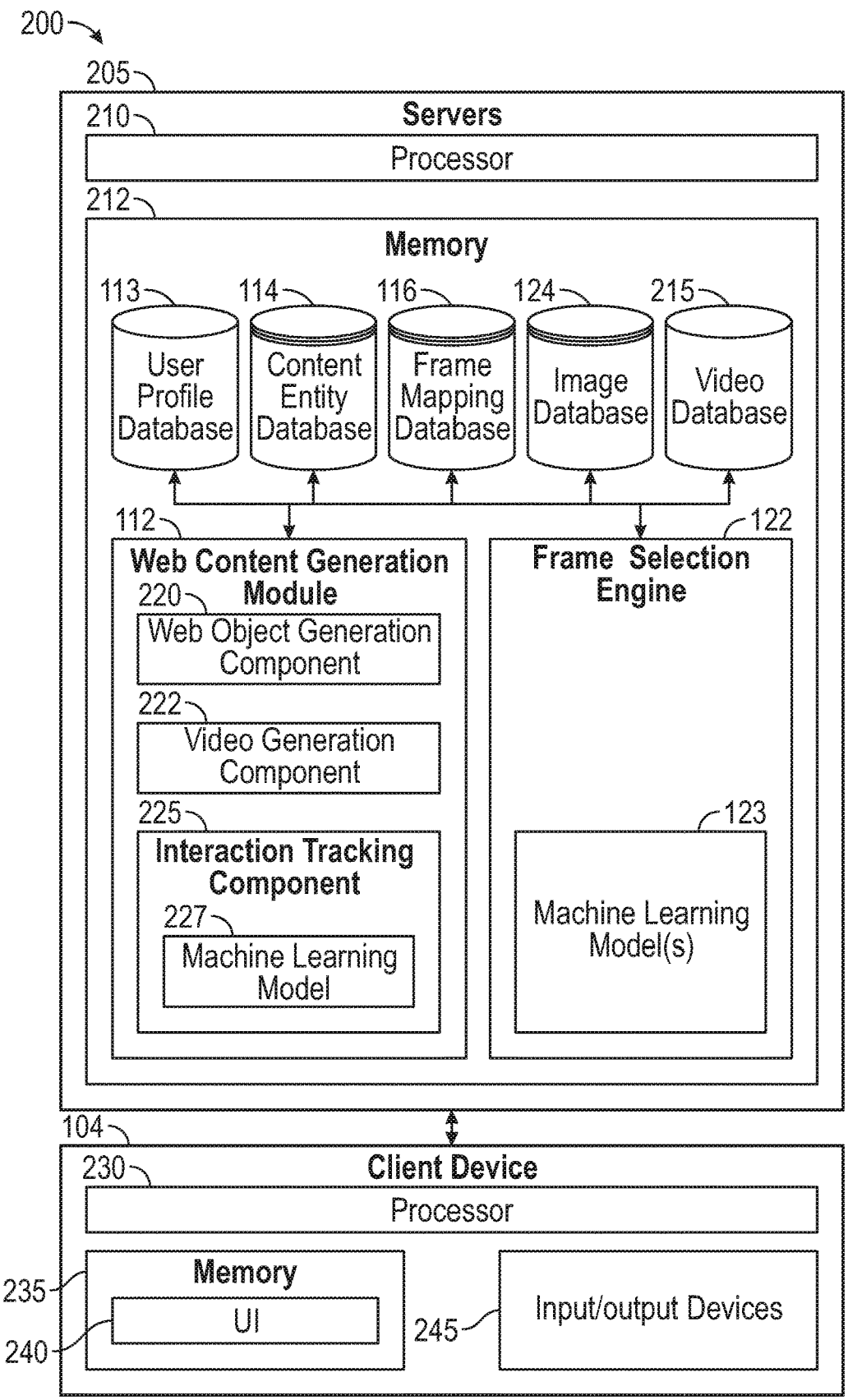
FIG. 2 is a block diagram illustrating a system configured with a transaction management module, according to one embodiment described herein.

FIG. 2 is a block diagram illustrating a system configured with a transaction management module, according to one embodiment described herein. As shown, the system 200 includes servers 205, which collectively provide processing capabilities 210 and memory 212. The memory 212 may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

Stored in the memory 212 are multiple data stores, including the user profile database 113, the content entity database 114, the frame mapping database 116, the image database 124 and the video database 215. The client device 104 has a processor 230, memory 235 (e.g., volatile, non-volatile, etc.) and input/output (I/O) devices 245. A user interface (UI) 240 is stored in the memory 235 and executed on the processor 230 to allow the client device 104 to access the servers 205 of service 106 and request various content items. In one implementation, the UI 240 corresponds to the client application described above. For example, the UI 240 could be provided by a web browser or other application that renders pages or content served by the servers 205. In one embodiment, the UI 240 includes an audio-based interface for a digital assistant service, where the user interacts with the UI 240 verbally (e.g., using a microphone device). For instance, a graphical UI 240 could be displayed using a display screen of the client device 104, and the user can interact with the display screen using a combination of touch and voice commands. Generally, the I/O devices 245 can include any device capable of providing output to users of the device (e.g., a display device for outputting images, a speaker device for outputting sounds, etc.) as well as any devices through which a user can provide input (e.g., a touchscreen device, a mouse, a keyboard, etc.).

As shown, the web content generation module 112 includes a web object generation component 220, a video generation component 222 and an interaction tracking component 225. Generally, the web object generation component 220 is configured to generate web objects (e.g., a hyperlink to a particular instance of video content hosted on the site and a corresponding, dynamically generated thumbnail image). The video generation component 222 is generally configured to generate original video content using, at least in part, one or more frames selected by the frame selection engine 122. For example, the frame selection engine 122 could select one or more frames from a particular movie trailer that are determined to depict a particular content entity (e.g., an actor starring in the movie relating to the movie trailer). The video generation component 222 could generate a biography video for the particular content entity that includes the selected one or more frames. Such a biography video could also contain, for example, clips extracted from other instances of video content (e.g., the movie trailer, the movie itself, interviews with the content entity, etc.), as well as information describing the content entity (e.g., extracted from the content entity database 114).

The interaction tracking component 225 is generally configured to monitor interactions with content displayed in the UI 240 of the client device 104. The interaction tracking component 225 can then adjust the behavior of the web content generation module 112, based on how users are interacting with the provided content. For example, the frame selection engine 122 could originally select 10 different frames that are determined to have a sufficiently high confidence value (e.g., exceeding a predefined threshold level of confidence) for depicting the first content entity and a sufficiently high measure of quality (e.g., exceeding a predefined threshold level of quality), and the web object generation component 220 could then select from the 10 different frames in generating content relating to the first content entity.

For example, in generating a thumbnail for a video associated with the first content entity for display on a page corresponding to the first content entity, the web object generation component 220 could select one of the 10 different frames each time the page is loaded. For instance, the web object generation component 220 could initially select one of the 10 frames randomly or pseudo-randomly. The interaction tracking component 225 can monitor interactions when the pages are displayed in the UI 240 of the client device 104, and could employ testing methodologies (e.g., A/B testing, multi-armed bandit testing, king of the hill methodologies, etc.) to evaluate which of the selected frames results is most optimal. For example, the interaction tracking component 225 could quantify the interactions with each of the rendered pages in the UI 240, and for each of the 10 frames, the interaction tracking component 225 could aggregate all of the quantified interaction metrics to produce an overall interaction score for the respective frame. The interaction tracking component 225 could then selectively remove one or more of the selected frames, e.g., the frames having the lowest overall interaction scores. Doing so enables the interaction tracking component 225 to evaluate how users are reacting to the dynamically generated content and to adjust how content is dynamically generated overtime to improve the performance of the site.

Figure 3:
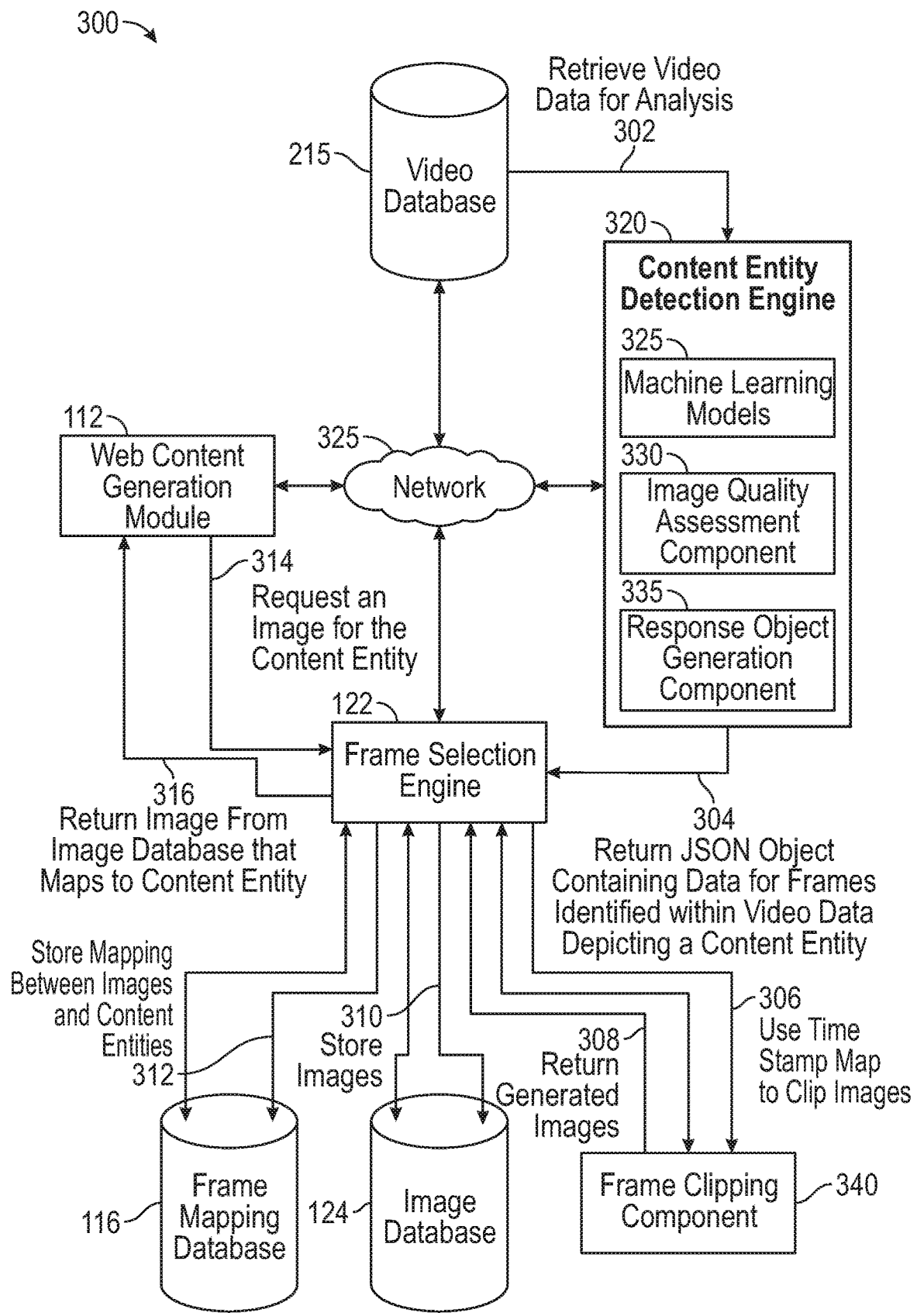
FIG. 3 is a block diagram illustrating a system configured with a content entity detection engine, according to one embodiment described herein.

FIG. 3 is a block diagram illustrating a system configured with a content entity detection engine, according to one embodiment described herein. As shown, the system 300 includes the web content generation module 112, the video database 215, the frame mapping database 116, the content entity detection engine 320, and the frame selection engine 122 interconnected via a network 310. Generally, the network 310 is representative of any data communications network (e.g., wired or wireless), such as a local area network (LAN), wide area network (WAN) and the Internet. Of note, while the web content generation module 112, the video database 215, the frame mapping database 116, the content entity detection engine 320 and the frame selection engine are depicted as being interconnected via a single network 310, such a depiction is for illustrative purposes only. More generally, the various components may be connected by various different communication networks, and in some embodiment, some of the depicted components may be unable to directly communicate with other depicted embodiments.

In the depicted embodiment, the content entity detection engine 320 contains machine learning models 325, an image quality assessment component 330 and a response object generation component 335. Generally, the content entity detection engine 320 is configured to analyze an instance of video content (e.g., a movie trailer) from the video database 215 and to generate a mapping between frames within the video content and content entities (e.g., content entities defined within the content entity database 114). For example, the content entity detection engine 320 could retrieve video data for analysis from the video database (arrow 302) and the content entity detection engine 320 could select frames from the instance of video content at a fixed interval (e.g., every 10 frames). The content entity detection engine 320 could provide a uniquely trained machine learning model 325 for each content entity recognized by the site (e.g., the content entities specified within the content entity database 114). Generally, such machine learning models 325 can be configured to accept an image (e.g., taken from playback of a frame of video data) and to output a confidence value indicating a likelihood that the input image contains a depiction of the corresponding content entity.

Although the depicted embodiment is shown as using the machine learning models 325 to calculate the confidence values indicating whether various content entities are depicted within a given frame, such a depiction is for illustrative purposes and without limitation. For example, in a particular embodiment, the content entity detection engine 320 includes software logic that, when executed, performs a facial recognition analysis to detect a group of pixels within the frame satisfying one or more predefined criteria. For example, such predefined criteria could be defined based on visual characteristics and features human faces generally possess and the orientation of those features. Upon comparing the detected group of pixels with predefined facial information for the first content entity and determining that a threshold level of similarity exists between the two, the content entity detection engine 320 can determine that the frame in question contains a depiction of the first content entity.

Returning to the depicted embodiment, the content entity detection engine 320 could analyze each selected frame from the instance of video content using the machine learning models 325 for the content entities, and can generate a mapping structure indicating whether each frame contains a depiction of a content entity (or content entities) and, if so, which content entity (or content entities) is depicted within the frame. For example, the content entity detection engine 320 could evaluate the confidence scores output by the machine learning models 325 against a predefined threshold level of confidence and can determine that any confidence scores exceeding such a threshold indicate that the corresponding content entity is depicted within the frame.

Additionally, the image quality assessment component 330 can analyze the frame to determine quality metrics associated with the frame. Such quality metrics can include, without limitation, a measure of blur within the frame, a measure of stillness for the frame, a contrast value for the frame, a brightness value for the frame, a bit depth corresponding to the frame, etc.). More generally, the image quality assessment component 330 can consider any parameter associated with image quality.

The response object generation component 335 can then generate a response object to return to the web content generation module 112, for use in generating dynamic content for the site. For example, in the depicted embodiment, the response object generation component 335 generates a JavaScript Object Notation (JSON) object containing a mapping between frames and content entities (e.g., an array or other data structure for each content entity, containing a time offset value for each frame containing a depiction of the respective content entity). In one embodiment, the frames are identified using a time offset from the beginning of the video content. More generally, any technique for identifying frames within video data can be used, consistent with the functionality described herein.

The response object generation component 335 returns the JSON object containing the data for the frames depicting the content entity to the frame selection engine 122 (arrow 304). Upon receiving the JSON object, the frame selection engine 122 uses a time stamp mapping within the JSON object to request that the frame clipping component clip images corresponding to the designated frames (arrow 306). In one embodiment, the response object generation component 335 can also package the image quality assessment metrics for the frames within the JSON object, and the resulting object can be transmitted to the frame selection engine 122 and/or the web content generation module 112 via the network 310 for use in generating dynamic content for the site.

The frame selection engine 122 uses the time stamp mapping within the JSON object to request that the frame clipping component 340 clip images corresponding to the identified frames (arrow 306). For example, the web content generation module 112 could transmit a request specifying a time stamp from the time stamp mapping to the frame clipping component 340, and the frame clipping component 340 could generate an image of the playback of the video content at the specified time stamp. The frame clipping component returns the generated images to the frame selection engine 122 (arrow 308), and the frame selection engine 122 stores the images in the image database 124 (arrow 310). Additionally, the frame selection engine 122 stores the mapping between the images (e.g., identified by their location within the image database 124) and the corresponding content entities within the frame mapping database 116.

At a subsequent moment in time, the web content generation module 112 requests an image for the content entity from the frame selection engine 122 (arrow 314). As discussed above, such an image could be used by the web content generation module 112 in a variety of different ways, including (but not limited to) as a thumbnail for the video data on a page of the site, as a thumbnail for the video data within a playlist, within an image gallery, for dynamically generating original video content, and so on. In response to the request, the frame selection engine 122 can query the frame mapping database 116 to determine an identifier of an image corresponding to the content entity, and the frame selection engine 122 can query the image database 124 to retrieve the image corresponding to the determined identifier. In addition to retrieving indications of the frames, the frame selection engine 122 can also retrieve metadata (e.g., measures of image quality for each frame, confidence values representing the machine learning model(s)'s 325 confidence that the frames depict the content entity, etc.) corresponding to a plurality of images relating to the content entity, and the frame selection engine 122 can select one of the images for retrieval based on the metadata.

The frame selection engine 122 returns the image retrieved from the image database that maps to the specified content entity (arrow 316). Of note, in some embodiments, the frame selection engine 122 may return data specifying where the generated image can be publicly assessed (e.g., a URL corresponding to the image) to the web content generation module 112, rather than the raw image data for the generated image. Of course, one of ordinary skill in the art will recognize that a number of different implementations can be used to carry out the functionality described herein, and the present example is provided for illustrative purposes only and without limitation.

Figure 4:
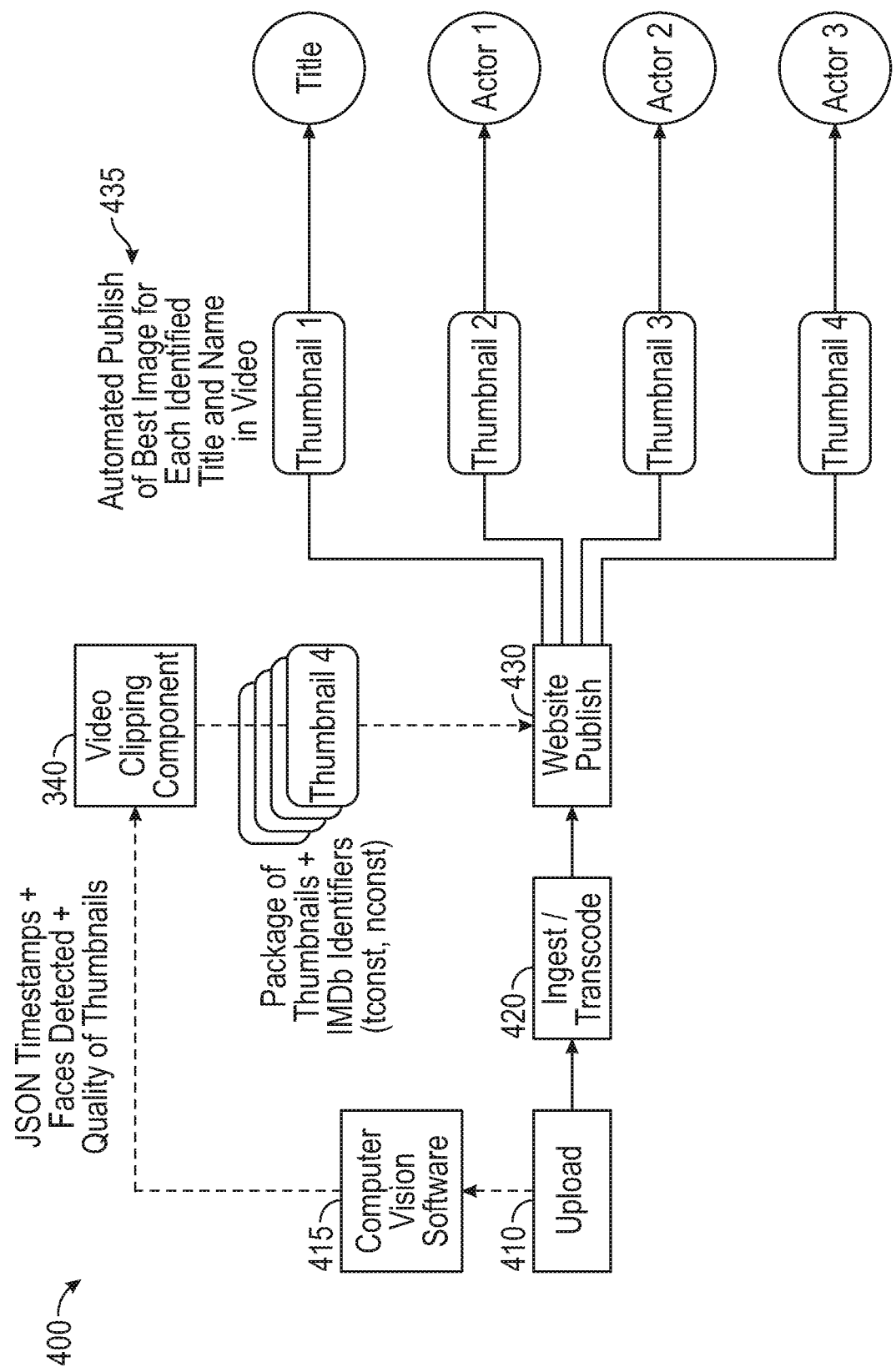
FIG. 4 is a block diagram illustrating a workflow for dynamically generating and publishing images for content entities, according to one embodiment described herein.

FIG. 4 is a block diagram illustrating a workflow for dynamically generating and publishing images for content entities, according to one embodiment described herein. As shown, the workflow 400 begins at block 410, where video content is uploaded to a site for processing. The uploaded video content can then be processed by computer vision software 415. In one embodiment, the computer vision software 415 represents the content entity detection engine 320, discussed above. Upon processing the video content, the computer vision software 415 generates and transmits a JSON object to the video clipping component 340. In the depicted embodiment, the JSON object contains timestamps for frames containing depictions of content entities, which content entities were detected within the frames, and measures of quality for each of the frames. In one embodiment, the computer vision software 415 is configured to write the timestamps and associated information to the frame mapping database 116. The video clipping component 340 can then generate a thumbnail for each frame of video content, by generating an image of the playback of the video content at each timestamp specified within the JSON object. In one embodiment, the generated thumbnails are stored in the image database 124.

Additionally, the uploaded video can be transmitted to an ingestion and transcoding service 420, where the data describing the video is stored within the video database 215 and more generally any other suitable locations on the site. Additionally, the video can be transcoded by the ingestion and transcoding service 420 into a number of different bitrates and encoding formats supported by the site. For example, the site could include separate transcoding profiles for high resolution streaming, moderate resolution streaming, resolutions and formats suitable for streaming on tablet devices, resolutions and formats suitable for streaming on mobile devices and so on. More generally, any type and any number of different transcoding profiles can be used, consistent with the functionality described herein.

The website publishing component 430 can automatically publish the best thumbnails for each identified title and each content entity depicted within the video (block 435). In doing so, the website publishing component 430 can evaluate the thumbnails using the quality metrics produced by the computer vision software. Additionally, the website publishing component 430 can evaluate the thumbnails based on the corresponding confidence values (e.g., representing the strength of the determination that the thumbnail contains a depiction of a particular content entity). Advantageously, doing so improves the performance of the site by providing for the automatic generation, cultivation and distribution of thumbnails from source video content.

Figure 5A:
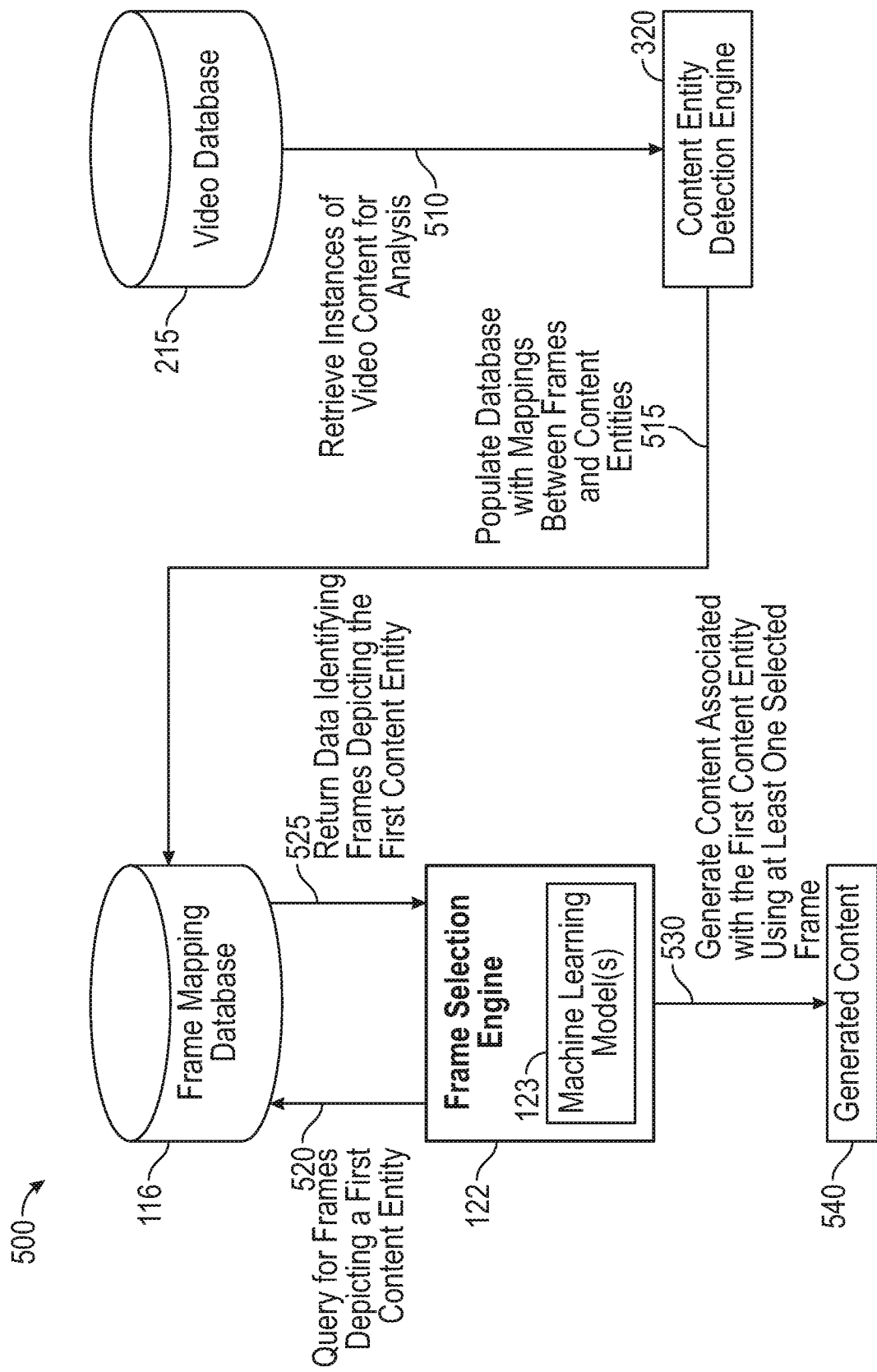
FIG. 5A-B are block diagrams illustrating workflows for generating content associated with a first content entity using selected frames extracted from an instance of video content and refining the usage of selected images based on interactions with content generated, according to one embodiment described herein.
Figure 5B:
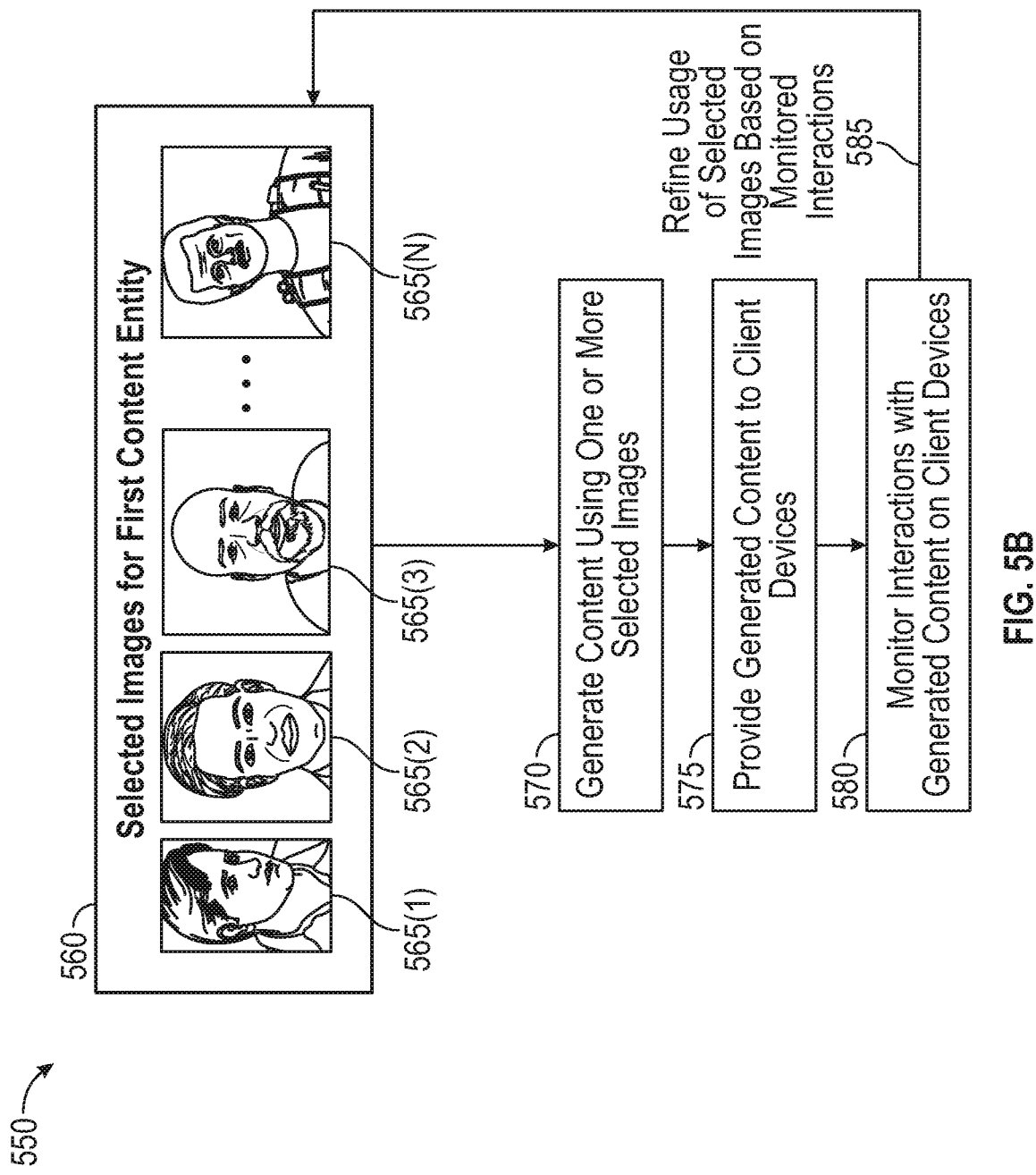

FIG. 5A-B are block diagrams illustrating workflows for generating content associated with a first content entity using selected frames extracted from an instance of video content and refining the usage of selected images based on interactions with content generated, according to one embodiment described herein. As shown, the workflow 500 begins at block 510, where the content entity detection engine 320 retrieves instances of video content for analysis 510 from the video database 215. The content entity detection engine 320 analyzes the instances of video content and populates the frame mapping database 116 with mappings between frames and content entities (block 515). For example, as discussed above, the content entity detection engine 320 could utilize a plurality of machine learning models 325, each corresponding to one of a plurality of content entities and each configured to analyze an input image and to output a measure of confidence that the input image depicts the corresponding content entity. In populating the frame mapping database 116, the content entity detection engine 320 could identify each frame determined to depict a particular content entity by specifying a time offset (e.g., relative to the beginning of the video content) that uniquely identifies the frame within the video content. As a result, the frame mapping database 116 may include data indicating various frames where each recognized content entity appears within the analyzed instances of video content.

In the workflow 500, the frame selection engine 122 submits a query for frames depicting a first content entity (block 520). In doing so, the frame selection engine 122 could specify a unique identifier corresponding to the first content entity within the query. In particular embodiments, the frame selection engine 122 can specify other information, such as a minimum level of quality the frames should have, a minimum confidence value for containing a depiction of the first content entity the frames should have, an expression(s) the depiction of the first content entity should have within the frames, and various other attributes describing the frames to be returned (e.g., a level of action depicted within the frames). The frame mapping database 116 returns data identifying the frames depicting the first content entity and satisfying any additional criteria specified within the query (block 525).

The frame selection engine 122 can then select one of the returned frames for use in generating content 540 (block 530). In the depicted embodiment, the frame selection engine 122 can process each returned frame as an input to the machine learning model 123, and can select the frame that is determined to be optimal for use in generating the content 540, based on the outputs of the machine learning model 123. In one embodiment, the frame mapping database 116 is configured to return an image captured during the playback of each frame satisfying the query criteria. In an alternate embodiment, the frame mapping database 116 returns a time offset (or other identifying information) for the frames, and the frame selection engine 122 can request an image for a selected frame from the video clipping software 425.

FIG. 5B is a block diagram illustrating a workflow for refining the usage of selected images based on interactions with content generated, according to one embodiment described herein. As shown, the workflow 550 includes a set of images 560 for a first content entity. Generally, each of the individual images 565(1)-(N) in the set of images 560 have been selected by the content entity detection engine 320 (or, in some embodiments, the frame selection engine 122), based on a determination that each of the individual images individual images 565(1)-(N) contains a depiction of a particular content entity (e.g., an actor). The web content generation module 112 can select one of the images from the one or more of the images 565(1)-(N) for use in generating content (block 570). For example, the web content generation module 112 could use the selected image as a thumbnail for a link to an instance of video content when generating a web page corresponding to the particular content entity.

The web content generation module 112 can provide the generated content to a plurality of client devices 104 (block 575) and can monitor interactions with the generated content on the client devices (block 580). For example, a software client executing on the client devices 104 can monitor user inputs while the user is interacting with the rendered web pages, and can transmit collected interaction data 120 to the web content generation module 112. The web content generation module 112 can then refine its usage of the set of selected images 560 based on the monitored interactions (block 585). For example, the web content generation module 112 could scale the frequency of usage of the individual images 565(1)-(N), based on the monitored interactions. For example, if content generated from the image 565(N) receives significantly more interactions from users than content generated from the other images in the set of selected images for the first content entity 560, the web content generation module 112 could increase the frequency of the usage of the image 565(N) in generating content. In one embodiment, the web content generation module 112 is configured to select different images based on a device type of the client device requesting the image (e.g., a higher resolution image could be selected for a desktop computer, while a lower resolution image could be selected for a mobile device). In such an embodiment, the web content generation module 112 can monitor interactions for the images separately across various types of devices and can scale the frequency of usage of the images accordingly.

In some instances, the web content generation module 112 could dynamically reduce the frequency of usage of one or more of the images 565(1)-(N) from the set of selected images for the first content entity 560, based on the monitored interactions. Continuing the example, if the web content generation module 112 determines that content generated using the image 565(2) receives the substantially less interactions from users, the web content generation module 112 could decrease the frequency of usage of the image 565(2) in generating content. In some instances, where the web content generation module 112 has decreased the frequency of usage of a particular image below a minimum threshold level of usage, the web content generation module 112 could remove the particular image from the set of selected images for the first content entity 560, such that the web content generation module 112 ceases use of the particular image in generating content relating to the first content entity.

In one embodiment, the web content generation module 112 is configured to calculate, for each of the selected plurality of frames, a respective interaction score representing how a frequency with which the generated content was interacted with when displayed on one of the client devices 104. The web content generation module 112 could then rank the images 565(1)-(N), based on the calculated interaction scores, and could select one or more images 565(1)-(N) having a lowest one or more calculated interaction scores for removal from the set of selected images for the first content entity 560.

Over time, the content entity detection engine 320 can process additional instances of video content (e.g., trailers for other movies the first content entity stars in) and the content entity detection engine 320 can continue to add images to the set of selected images for the first content entity 560. For example, the content entity detection engine 320 could identify frames within the additional instances of video content that depict the first content entity, and the video clipping software 425 could generate an image from the playback of each identified frame. The web content generation module 112 can then evaluate these additional images by monitoring user interactions with content generated using the additional images, and can scale the frequency of usage of the images accordingly.

As discussed above, the web content generation module 112 can include dynamically generated images that depict a content entity (e.g., as thumbnails for video content) on a page corresponding to the content entity. In one embodiment, the web content generation module 112 is configured to determine an optimal placement for video content and an image(s) to use as a thumbnail for the video content on other pages of the site that are not directly associated with the content entity. For example, the web content generation module 112 could use a dynamically generated thumbnail for a page for a movie with multiple co-starring content entities, where the frame selection engine 122 considered preferences and other data relating to a user currently browsing the page in selecting the thumbnail image. For example, where the frame selection engine 122 determines that the current user is following a particular content entity that appears within the movie, the frame selection engine 122 could select a frame that depicts the particular content entity for display to the user.

In some instances, the frame selection engine 122 may determine that the user is following multiple different content entities appearing in the movie. In such a circumstance, the frame selection engine 122 could alternate between these different content entities in selecting thumbnail images to display. For example, the frame selection engine 122 could randomly or pseudo-randomly select between the different content entities in selecting an image to display, or could use a round robin methodology in selecting the content entity to depict for a given rendering of the page. As another example, where the frame selection engine 122 determines that the current user has an affinity towards a particular one of the content entities relative to the others, the frame selection engine 122 could give a preference towards the particular content entity (e.g., by selecting images depicting the particular content entity more frequently than images depicting the other content entities that the user is following).

Figure 6:
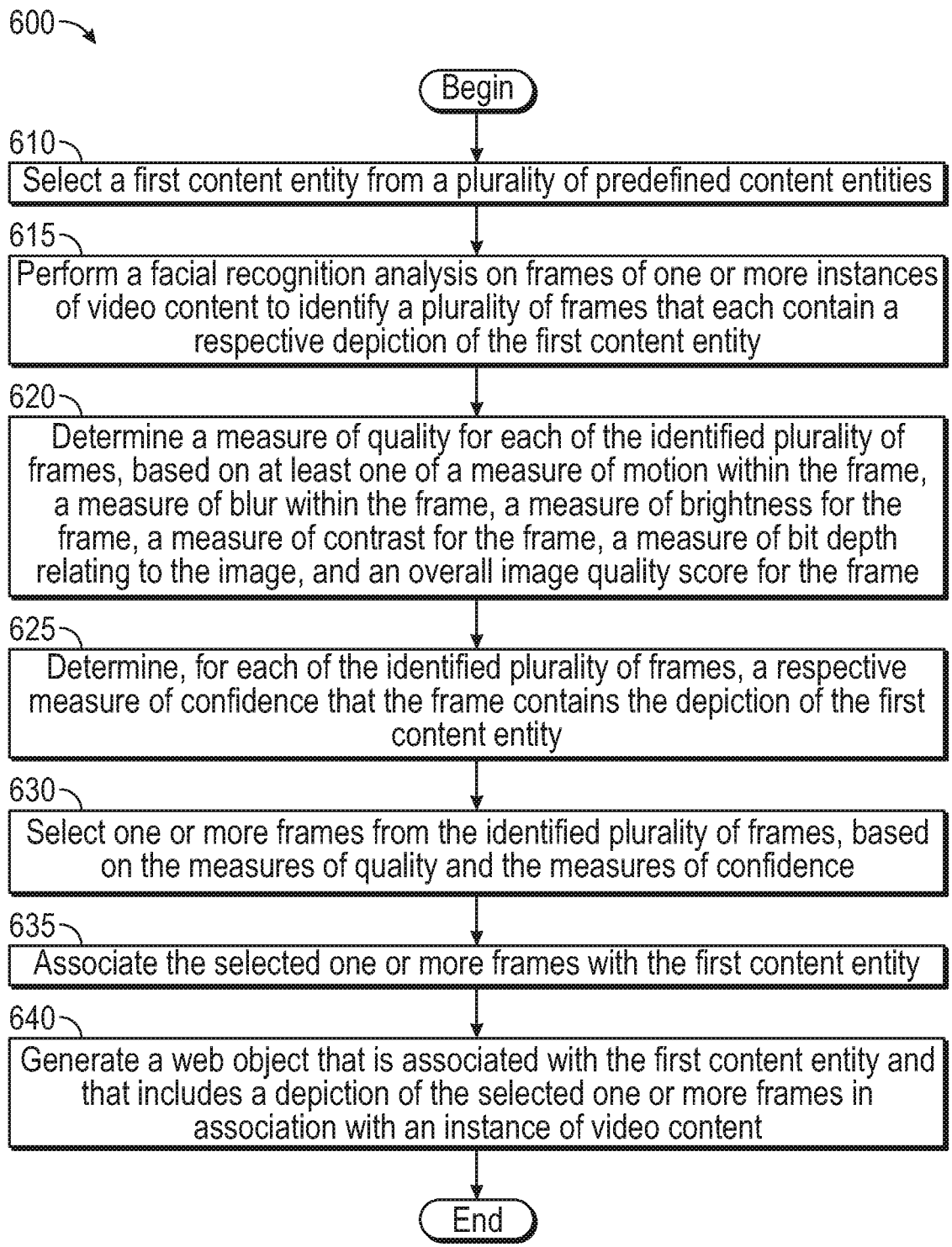
FIG. 6 is a flow diagram illustrating a method for generating a web object associated with a first content entity using frames of video content identified as depicting the first content entity, according to one embodiment described herein.

FIG. 6 is a flow diagram illustrating a method for generating a web object associated with a first content entity using frames of video content identified as depicting the first content entity, according to one embodiment described herein. As shown, the method 600 begins at block 610, where the web content generation module 112 selects a first content entity from a plurality of predefined content entities. For example, web content generation module 112 could select the first content entity based on receiving a web content request specifying an identifier associated with the first content entity. The content entity detection engine 320 performs a facial recognition analysis on frames of one or more instances of video content to identify a plurality of frames that each contain a respective depiction of the first content entity (block 615). For example, the content entity detection engine 320 could analyze a subset of frames within the one or more instances of video content (e.g., every 10 frames) and could identify, for each analyzed frame, any content entities within the plurality of predefined content entities that are depicted within the respective frame.

The content entity detection engine 320 could further determine a measure of quality for each of the identified plurality of frames (block 620). For example, the content entity detection engine 320 could determine the measure of quality based on at least one of a measure of motion within the frame, a measure of blur within the frame, a measure of brightness for the frame, a measure of contrast for the frame, a measure of bit depth relating to the image, and an overall image quality score for the frame. Additionally, the content entity detection engine 320 could determine, for each of the identified plurality of frames, a respective measure of confidence that the frame contains the depiction of the first content entity (block 625). For example, the content entity detection engine 320 could process a frame as an input to a machine learning model configured to identify depictions of the first content entity, and the machine learning model could output a confidence value indicating a strength of the determination that the input frame contains a depiction of the first content entity.

The frame selection engine 122 could then select one or more frames from the identified plurality of frames, based on the measures of quality and the measures of confidence (block 630). The frame selection engine 122 could associate the selected one or more frames with the first content entity (block 635). The web content generation module 112 could then generate a web object that is associated with the first content entity and that includes a depiction of the selected one or more frames in association with an instance of video content (block 640), and the method 600 ends.

Figure 7:
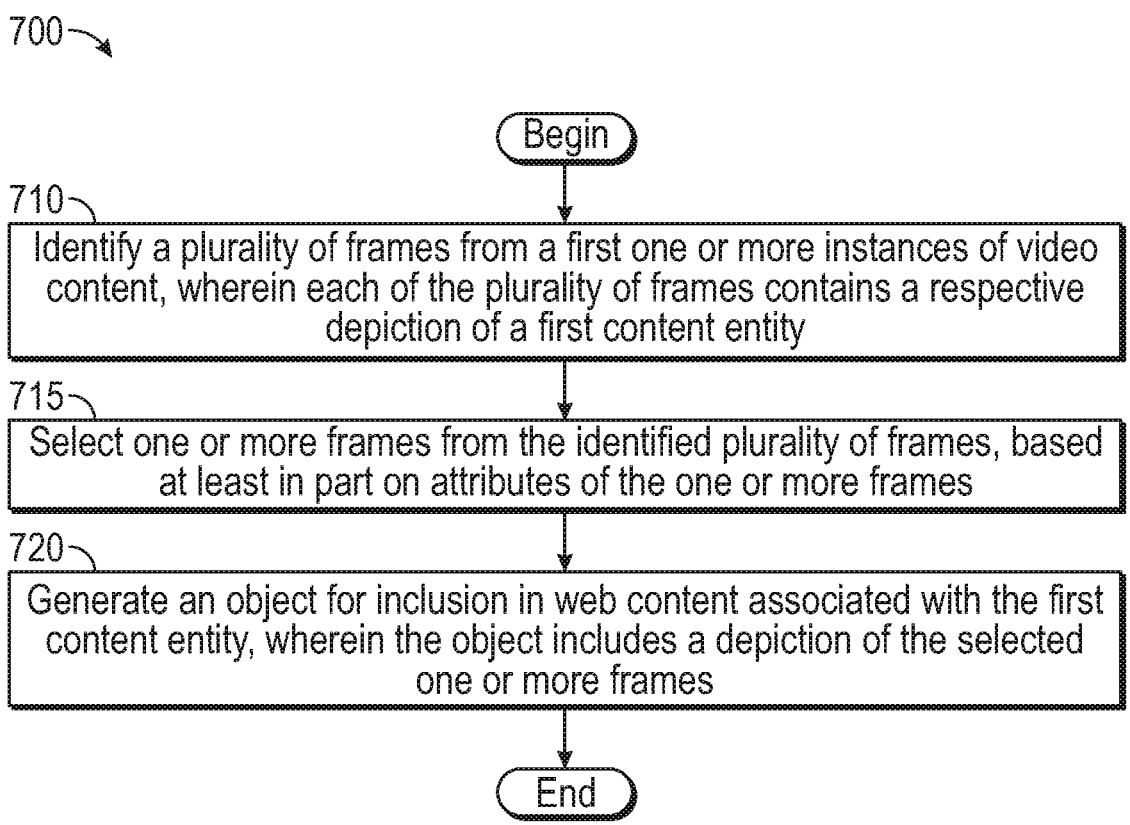
FIG. 7 is a flow diagram illustrating a method for generating an object for inclusion in web content associated with a first content entity using one or more selected frames from a first one or more instances of video content, according to one embodiment described herein.

FIG. 7 is a flow diagram illustrating a method for generating an object for inclusion in web content associated with a first content entity using one or more selected frames from a first one or more instances of video content, according to one embodiment described herein. As shown, the method 700 begins at block 710, where the content entity detection engine 320 identifies a plurality of frames from a first one or more instances of video content, where each of the plurality of frames contains a respective depiction of a first content entity. The frame selection engine 122 selects one or more frames from the identified plurality of frames, based at least in part on attributes of the one or more frames (block 715). The web content generation module 112 generates an object for inclusion in web content associated with the first content entity, where the object includes a depiction of the selected one or more frames (block 720), and the method 700 ends.

Figure 8:
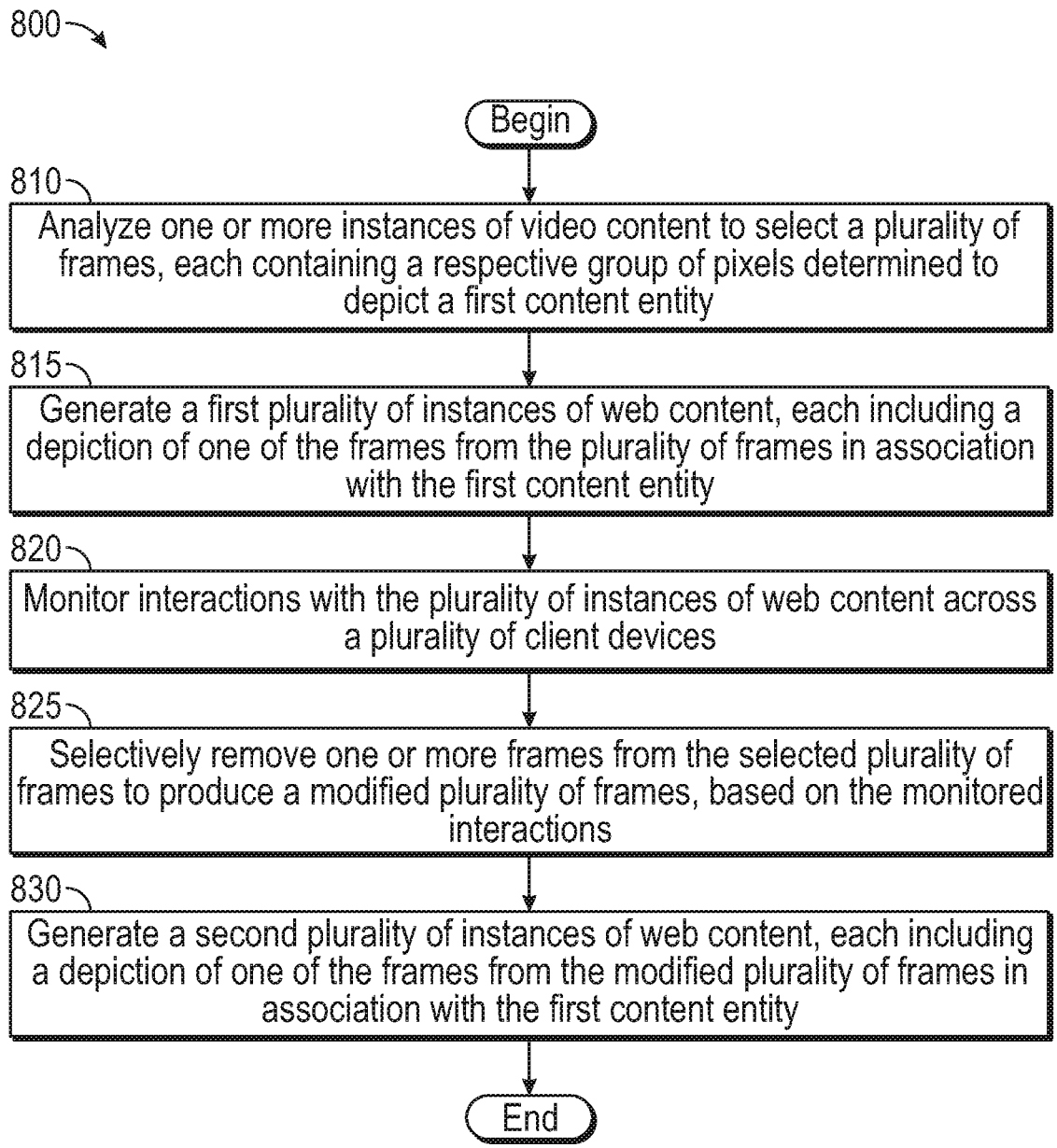
FIG. 8 is a flow diagram illustrating a method for selectively pruning a plurality of frames used to dynamically generate instances of web content associated with a first content entity, according to one embodiment described herein.

FIG. 8 is a flow diagram illustrating a method for selectively pruning a plurality of frames used to dynamically generate instances of web content associated with a first content entity, according to one embodiment described herein. As shown, the method 800 begins at block 810, where the content entity detection engine 320 analyzes one or more instances of video content to select a plurality of frames, each containing a respective group of pixels determined to depict a first content entity. The content entity detection engine 320 could then populate the frame mapping database 116 with data mapping frames from the one or more instances of video content with at least the first content entity.

The web content generation module 112 generates a first plurality of instances of web content, each including a depiction of one of the frames from the plurality of frames in association with the first content entity (block 815). The web content generation module 112 further monitors interactions with the plurality of instances of web content across a plurality of client devices (block 820). For example, an application on each of the plurality of client devices could monitor input operations while the web content is being displayed and could transmit data collected from monitoring the monitored input operations to the web content generation module 112.

The frame selection engine 122 selectively removes one or more frames from the selected plurality of frames to produce a modified plurality of frames, based on the monitored interactions (block 825). For example, the frame selection engine 122 could calculate a level of interaction for each of the frames based on interactions with the web content generated using each of the frames, and the frame selection engine 122 could remove the one or more frames having the lowest level of interaction. The web content generation module 112 generates a second plurality of instances of web content, each including a depiction of one of the frames from the modified plurality of frames in association with the first content entity (block 830), and the method 800 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the web content generation module 112) or related data available in the cloud. For example, the web content generation module 112 could execute on a computing system in the cloud and could dynamically generate digital content using one or more images associated with frames selected by the frame selection engine 122. In such a case, the web content generation module 112 could receive a web content request specifying a first content entity and could request one or more images relating to the first content entity from the frame selection engine 122. The web content generation module 112 could then generate digital content using the one or more images and store the digital content at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code that, when executed by operation of one or more computer processors, performs an operation comprising:
   selecting, based on analyzing a first one or more instances of video content, a first plurality of frames from the first one or more instances of video content, wherein each frame of the first plurality of frames that is selected contains a respective group of pixels that depicts a same first content entity within the first one or more instances of video content;
   generating a first plurality of instances of web content, each instance of web content of the first plurality of instances of web content including a depiction of a different frame, from the selected first plurality of frames, that depicts the same first content entity;
   monitoring interactions with the first plurality of instances of web content across a plurality of client devices;
   selectively removing one or more frames from the selected first plurality of frames to produce a modified plurality of frames, based on the monitored interactions, wherein each frame of the modified plurality of frames contains a respective group of pixels that depicts the same first content entity; and
   generating a second plurality of instances of web content, each instance of web content of the second plurality of instances of web content including a depiction of a different frame, from the modified plurality of frames, that depicts the same first content entity.

2. The non-transitory computer-readable medium of claim 1, wherein selectively removing one or more frames from the selected first plurality of frames to produce the modified plurality of frames, based on the monitored interactions comprises:
   calculating, for each frame of the selected first plurality of frames, a respective interaction score representing a frequency of interaction across one of the plurality of client devices with the respective one of the first plurality of instances of web content including the depiction of the frame of the selected first plurality of frames; and
   ranking the selected first plurality of frames, based on the calculated interaction scores, wherein the one or more frames selectively removed from the selected first plurality of frames have a lowest one or more calculated interaction scores.

3. The non-transitory computer-readable medium of claim 1, the operation further comprising:
   selecting, based on analyzing a second one or more instances of video content, a second plurality of frames from the second one or more instances of video content, wherein each frame of the second plurality of frames that is selected contains a respective group of pixels that depicts the same first content entity;
   combining the second plurality of frames with the modified plurality of frames, to produce a combined plurality of frames; and
   generating a third plurality of instances of web content, each instance of web content of the third plurality of instances of web content including a depiction of a different frame, from the combined plurality of frames, that depicts the same first content entity.

4. The non-transitory computer-readable medium of claim 1, wherein analyzing the first one or more instances of video content comprises:
   analyzing the first one or more instances of video content to identify a set of frames that each contain a respective depiction of the first content entity;
   determining a measure of quality for each of the identified set of frames; and
   determining, for each of the identified set of frames, a respective measure of confidence that the respective group of pixels in the frame of the identified set of frames depicts the first content entity.

5. The non-transitory computer-readable medium of claim 4, wherein analyzing the first one or more instances of video content further comprises selecting one or more frames from the identified set of frames, based on the measures of quality and the measures of confidence.

6. The non-transitory computer-readable medium of claim 1, the operation further comprising determining a placement of at least one of the second plurality of instances of web content within a page comprising a third plurality of instances of web content.

7. The non-transitory computer-readable medium of claim 6, wherein the page comprising the third plurality of instances of web content is not associated with the first content entity.

8. A computer-implemented method comprising:
selecting, based on analyzing a first one or more instances of video content, a first plurality of frames from the first one or more instances of video content, wherein each frame of the first plurality of frames that is selected contains a respective group of pixels that depicts a same first content entity within the first one or more instances of video content;
generating a first plurality of instances of web content, each instance of web content of the first plurality of instances of web content including a depiction of a different frame, from the selected first plurality of frames, that depicts the same first content entity;
monitoring interactions with the first plurality of instances of web content across a plurality of client devices;
selectively removing one or more frames from the selected first plurality of frames to produce a modified plurality of frames, based on the monitored interactions, wherein each frame of the modified plurality of frames contains a respective group of pixels that depicts the same first content entity; and
generating a second plurality of instances of web content, each instance of web content of the second plurality of instances of web content including a depiction of a different frame, from the modified plurality of frames, that depicts the same first content entity.

9. The computer-implemented method of claim 8, wherein selectively removing one or more frames from the selected first plurality of frames to produce the modified plurality of frames, based on the monitored interactions comprises:
calculating, for each frame of the selected first plurality of frames, a respective interaction score representing a frequency of interaction across one of the plurality of client devices with the respective one of the first plurality of instances of web content including the depiction of the frame of the selected first plurality of frames; and
ranking the selected first plurality of frames, based on the calculated interaction scores, wherein the one or more frames selectively removed from the selected first plurality of frames have a lowest one or more calculated interaction scores.

10. The computer-implemented method of claim 8, further comprising:
selecting, based on analyzing a second one or more instances of video content, a second plurality of frames from the second one or more instances of video content, wherein each frame of the second plurality of frames that is selected contains a respective group of pixels that depicts the same first content entity;
combining the second plurality of frames with the modified plurality of frames, to produce a combined plurality of frames; and
generating a third plurality of instances of web content, each instance of web content of the third plurality of instances of web content including a depiction of a different frame, from the combined plurality of frames, that depicts the same first content entity.

11. The computer-implemented method of claim 8, wherein analyzing the first one or more instances of video content comprises:
analyzing the first one or more instances of video content to identify a set of frames that each contain a respective depiction of the first content entity;
determining a measure of quality for each of the identified set of frames; and
determining, for each of the identified set of frames, a respective measure of confidence that the respective group of pixels in the frame of the identified set of frames depicts the first content entity.

12. The computer-implemented method of claim 11, wherein analyzing the first one or more instances of video content further comprises selecting one or more frames from the identified set of frames, based on the measures of quality and the measures of confidence.

13. The computer-implemented method of claim 8, further comprising determining a placement of at least one of the second plurality of instances of web content within a page comprising a third plurality of instances of web content.

14. The computer-implemented method of claim 13, wherein the page comprising the third plurality of instances of web content is not associated with the first content entity.

15. A system comprising:
one or more computer processors; and
a memory containing computer program code that, when executed by operation of the one or more computer processors, performs an operation comprising:
selecting, based on analyzing a first one or more instances of video content, a first plurality of frames from the first one or more instances of video content, wherein each frame of the first plurality of frames that is selected contains a respective group of pixels that depicts a same first content entity within the first one or more instances of video content;
generating a first plurality of instances of web content, each instance of web content of the first plurality of instances of web content including a depiction of a different frame, from the selected first plurality of frames, that depicts the same first content entity;
monitoring interactions with the first plurality of instances of web content across a plurality of client devices;
selectively removing one or more frames from the selected first plurality of frames to produce a modified plurality of frames, based on the monitored interactions, wherein each frame of the modified plurality of frames contains a respective group of pixels that depicts the same first content entity; and
generating a second plurality of instances of web content, each instance of web content of the second plurality of instances of web content including a depiction of a different frame, from the modified plurality of frames, that depicts the same first content entity.

16. The system of claim 15, wherein selectively removing one or more frames from the selected first plurality of frames to produce the modified plurality of frames, based on the monitored interactions comprises:
calculating, for each frame of the selected first plurality of frames, a respective interaction score representing a frequency of interaction across one of the plurality of client devices with the respective one of the first plurality of instances of web content including the depiction of the frame of the selected first plurality of frames; and
ranking the selected first plurality of frames, based on the calculated interaction scores, wherein the one or more frames selectively removed from the selected first plurality of frames have a lowest one or more calculated interaction scores.

17. The system of claim 15, the operation further comprising:
selecting, based on analyzing a second one or more instances of video content, a second plurality of frames from the second one or more instances of video content, wherein each frame of the second plurality of frames that is selected contains a respective group of pixels that depicts the same first content entity;
combining the second plurality of frames with the modified plurality of frames, to produce a combined plurality of frames; and
generating a third plurality of instances of web content, each instance of web content of the third plurality of instances of web content including a depiction of a different frame, from the combined plurality of frames, that depicts the same first content entity.

18. The system of claim 15, wherein analyzing the first one or more instances of video content comprises:
analyzing the first one or more instances of video content to identify a set of frames that each contain a respective depiction of the first content entity;
determining a measure of quality for each of the identified set of frames; and
determining, for each of the identified set of frames, a respective measure of confidence that the respective group of pixels in the frame of the identified set of frames depicts the first content entity.

19. The system of claim 18, wherein analyzing the first one or more instances of video content further comprises selecting one or more frames from the identified set of frames, based on the measures of quality and the measures of confidence.

20. The system of claim 15, the operation further comprising determining a placement of at least one of the second plurality of instances of web content within a page comprising a third plurality of instances of web content.

* * * * *